US009004287B2

(12) United States Patent
Liedl

(10) Patent No.: US 9,004,287 B2
(45) Date of Patent: Apr. 14, 2015

(54) APPARATUS FOR SORTING AGRICULTURAL PRODUCTS

(71) Applicant: Charlotte Anna Maria Liedl, Lana (IT)

(72) Inventor: Charlotte Anna Maria Liedl, Lana (IT)

( * ) Notice: Subject to any disclaimer, the term of this patent is extended or adjusted under 35 U.S.C. 154(b) by 163 days.

(21) Appl. No.: 13/850,784

(22) Filed: Mar. 26, 2013

(65) Prior Publication Data

US 2013/0334109 A1  Dec. 19, 2013

(30) Foreign Application Priority Data

Jun. 19, 2012 (IT) .............................. MO2012A0158

(51) Int. Cl.
| | | |
|---|---|---|
| *B07C 5/16* | (2006.01) | |
| *B07C 5/342* | (2006.01) | |
| *B65G 37/00* | (2006.01) | |
| *B65G 43/08* | (2006.01) | |
| *B65G 47/24* | (2006.01) | |
| *B65G 47/52* | (2006.01) | |
| *B65G 47/96* | (2006.01) | |

(52) U.S. Cl.
CPC . *B07C 5/16* (2013.01); *B07C 5/342* (2013.01); *B65G 37/005* (2013.01); *B65G 43/08* (2013.01); *B65G 47/24* (2013.01); *B65G 47/52* (2013.01); *B65G 47/962* (2013.01)

(58) Field of Classification Search
CPC .......... B07C 3/082; B07C 5/34; B65G 47/96; B65G 47/962
USPC ......... 198/370.04, 370.08; 209/576, 592, 698
See application file for complete search history.

(56) References Cited

U.S. PATENT DOCUMENTS

| | | | | |
|---|---|---|---|---|
| 5,244,100 A | * | 9/1993 | Regier et al. ................ 209/556 |
| 5,477,955 A | * | 12/1995 | Madden et al. .......... 198/370.04 |
| 5,626,236 A | * | 5/1997 | Hiebert ........................ 209/538 |
| 5,662,206 A | * | 9/1997 | Baum et al. .............. 198/370.04 |
| 5,677,516 A | * | 10/1997 | Leverett ........................... 177/52 |
| 6,082,522 A | * | 7/2000 | Polling ..................... 198/370.04 |
| 6,234,297 B1 | * | 5/2001 | Blanc ........................ 198/370.04 |
| 6,374,983 B1 | * | 4/2002 | Morigi ..................... 198/370.07 |
| 7,222,715 B2 | * | 5/2007 | Madden et al. .......... 198/370.04 |
| 7,395,914 B2 | * | 7/2008 | van Wijngaarden et al. ........................ 198/370.04 |
| 7,410,044 B2 | * | 8/2008 | Kennedy .................. 198/370.04 |
| 8,746,435 B2 | * | 6/2014 | Nijland .................... 198/370.04 |
| 2011/0309004 A1 | * | 12/2011 | Morley ......................... 209/577 |

FOREIGN PATENT DOCUMENTS

| | | |
|---|---|---|
| FR | 2682941 A1 | 4/1993 |
| FR | 2927007 A1 | 8/2009 |

* cited by examiner

*Primary Examiner* — Joseph C Rodriguez
(74) *Attorney, Agent, or Firm* — Pearne & Gordon LLP

(57) ABSTRACT

An apparatus for sorting agricultural products, including:
- a conveyor line (1) to convey products (P) along an advancement direction (A);
- an entry section (3), where the products are arranged on the conveyor line;
- an unloading section (4);
- a control section (6), interposed between the entry section and the unloading section to attribute a signal indicative of predefined physical characteristics to each product.

The conveyor line includes:
- a first conveyor device (9) to convey the agricultural products forward;
- a second conveyor device (20), to convey the products forward and to cause the products to roll over, extending from the entry section to at least as far as an intermediate tract of the control section and that is movable between a first operating configuration, wherein it supports the products, and a second operating configuration, wherein it releases the products onto the first conveyor device.

10 Claims, 11 Drawing Sheets

APPARATUS FOR SORTING AGRICULTURAL PRODUCTS

The present invention relates to an apparatus for sorting agricultural products.

In particular, the present invention relates to an apparatus able to automatically group agricultural products having a spherical or elongated conformation according to respective aesthetic and dimensional characteristics.

As is known, apparatuses for sorting agricultural products comprise a conveyor device with which a plurality of conveyors are associated. Each conveyor is predisposed to contain and convey a predefined agricultural product forward along a control and sorting line. This line develops between a loading section wherein the products are positioned on the conveyors, and an unloading section wherein the products are grouped and sorted based on the mentioned aesthetic and dimensional characteristics.

In particular, the control and sorting line has an optical device for analysing the individual products that are conveyed forward in succession. The optical device attributes a signal to each product identifying the dimensions of the agricultural product. This device further assesses the aesthetic appearance and surface integrity of the agricultural product so as to trace any damaged products.

Furthermore, the control and sorting line is equipped with a weighing device, which weighs each product supported by a conveyor. This weighing device is generally comprised of a pair of load cells located in a predetermined position along the path followed by the conveyors. The load cells measure the weight of the agricultural product conveyed as each conveyor passes. Hence each product is also attributed with a signal identifying the weight of that agricultural product.

Each conveyor comprises a supporting tray, generally having a concave conformation so as to better contain the agricultural product.

The conveyors are arranged in an ordered row along a motorised chain and are equidistant from each other. Each conveyor also comprises, further to a tray, a pair of rollers, alongside the tray to cause the product to roll over while being conveyed forward between the loading section and the viewing device.

During the advancement of the conveyors, the rollers slide on special rails to turn about respective axes that are perpendicular to their own advancement direction. In this way, throughout the whole path of the products from the loading section to the viewing section, the individual products are made to roll on themselves on the tray on which they are arranged.

The rotation of the products hence allows the analysis by the optical device of the whole surface of each product.

The conveyors further comprise an exclusion mechanism of the rollers to allow the correct measurement of the weight of the products without the movement of the rollers interfering with the measurement of the weight. This mechanism is activated in correspondence with the weighing device, which substantially only intervenes on the individual trays. In particular, the rollers are dissociated from the base trays at least for the tract that passes in correspondence with the weighing device.

The unloading section has a plurality of zones, each of which is generally equipped with a conveyor belt, differentiated from each other according to the characteristics that the products must have. For example, the zones can be split up according to product weight, dimension or aesthetic quality observed by the optical device.

The conveyor device further comprises a plurality of expulsion organs, each located in correspondence with an unloading zone. Each expulsion organ is activatable in correspondence with its own unloading zone so as to cause the unloading of the products from its own tray, arranging them in the envisaged unloading zone.

An appropriate electronic management control unit activates the expulsion organ of each unloading zone when a conveyor transits in the corresponding zone to the signals identifying the characteristics of the supported product. For example, for damaged products, the control unit activates the expulsion organ in the unloading zone envisaged for damaged products every time a conveyor to which a damaged product signal has been attributed transits in correspondence with the unloading zone destined for damaged products.

Consequently, the products are supplied and grouped into the respective zones according to the weight, dimensional and aesthetic characteristics. The expulsion organ is generally comprised of an electromagnetic actuator, able to move each tray to unload the product to the side of its own conveyor. This unload is performed by inclining the tray on which the product is resting. In this way the product rolls towards the destination conveyor belt.

The Applicant has observed that unloading products from conveyors implies significant disadvantages due to the likely damage to the agricultural products.

In fact, the product falling from its tray onto the belt can cause the bruising or partial crushing of the product itself.

Another significant disadvantage is given by the structural complexity of the conveyors. Each support is, in fact, equipped with rollers and the roller exclusion system. Such devices, as well as increasing the weight and dimensions of the supports, have particularly complex and expensive mechanics.

It must also be considered that the conveyors for the products require particularly careful maintenance so as to guarantee the correct operation of the exclusion system. This maintenance has a negative impact on the sorting times and costs of agricultural products.

The object of the present invention is therefore to provide an apparatus for sorting agricultural products that can solve the problems described above.

In particular, the object of the present invention is to provide a structurally simple apparatus, with contained dimensions and costs.

A further object of the present invention is that of providing an apparatus for sorting agricultural products able to carefully handle the products and protect them from any damage due to their sorting.

The technical characteristics of the invention, according to the aforementioned objects, can clearly be seen from the contents of the following claims, and the advantages thereof will more fully emerge from the following detailed description with reference to the accompanying drawings, which represent a purely exemplificative and non-limiting embodiment, wherein:

Figure 1:
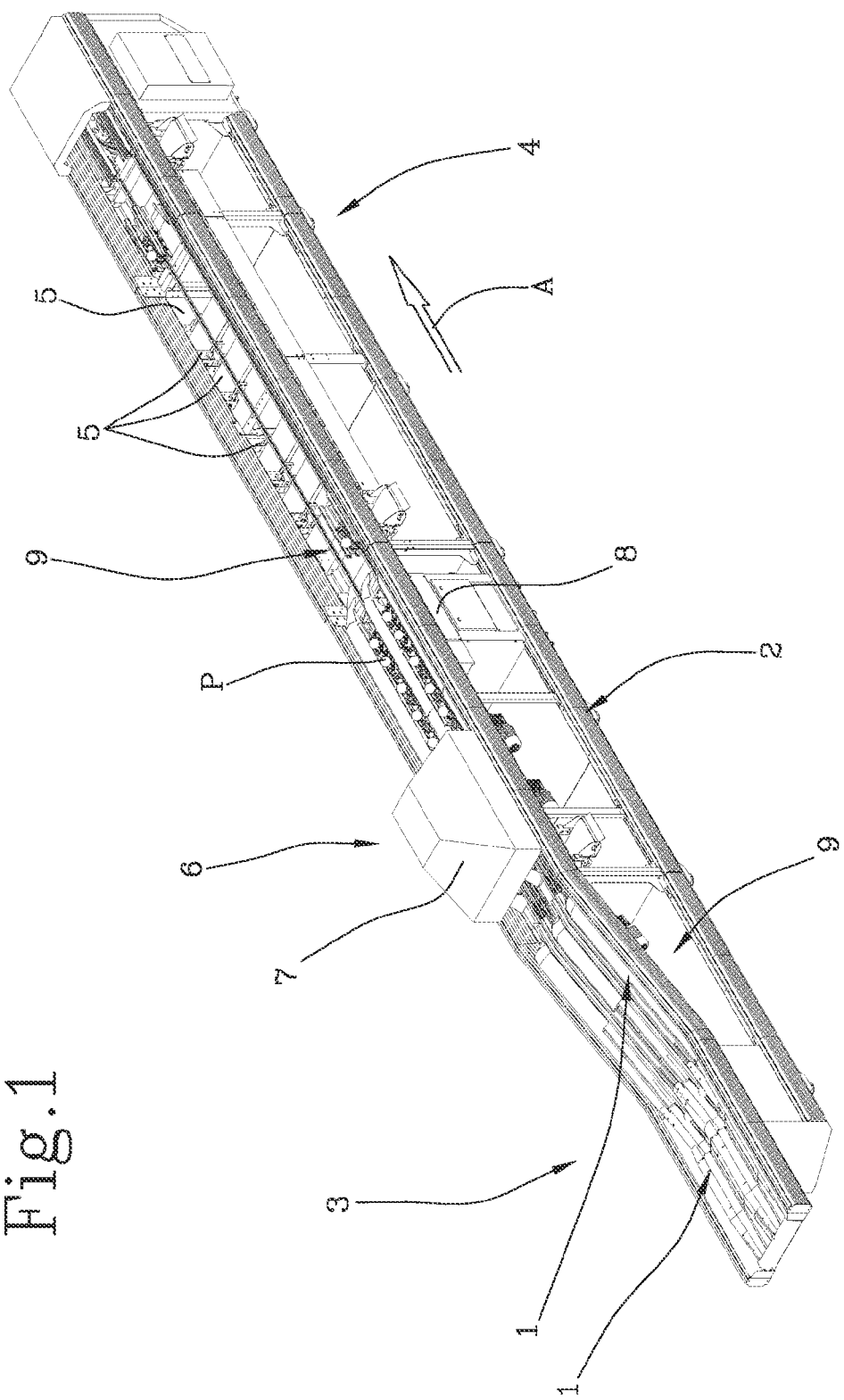
FIG. 1 illustrates an axonometric view of the apparatus for sorting agricultural products according to the present invention.
Figure 2:
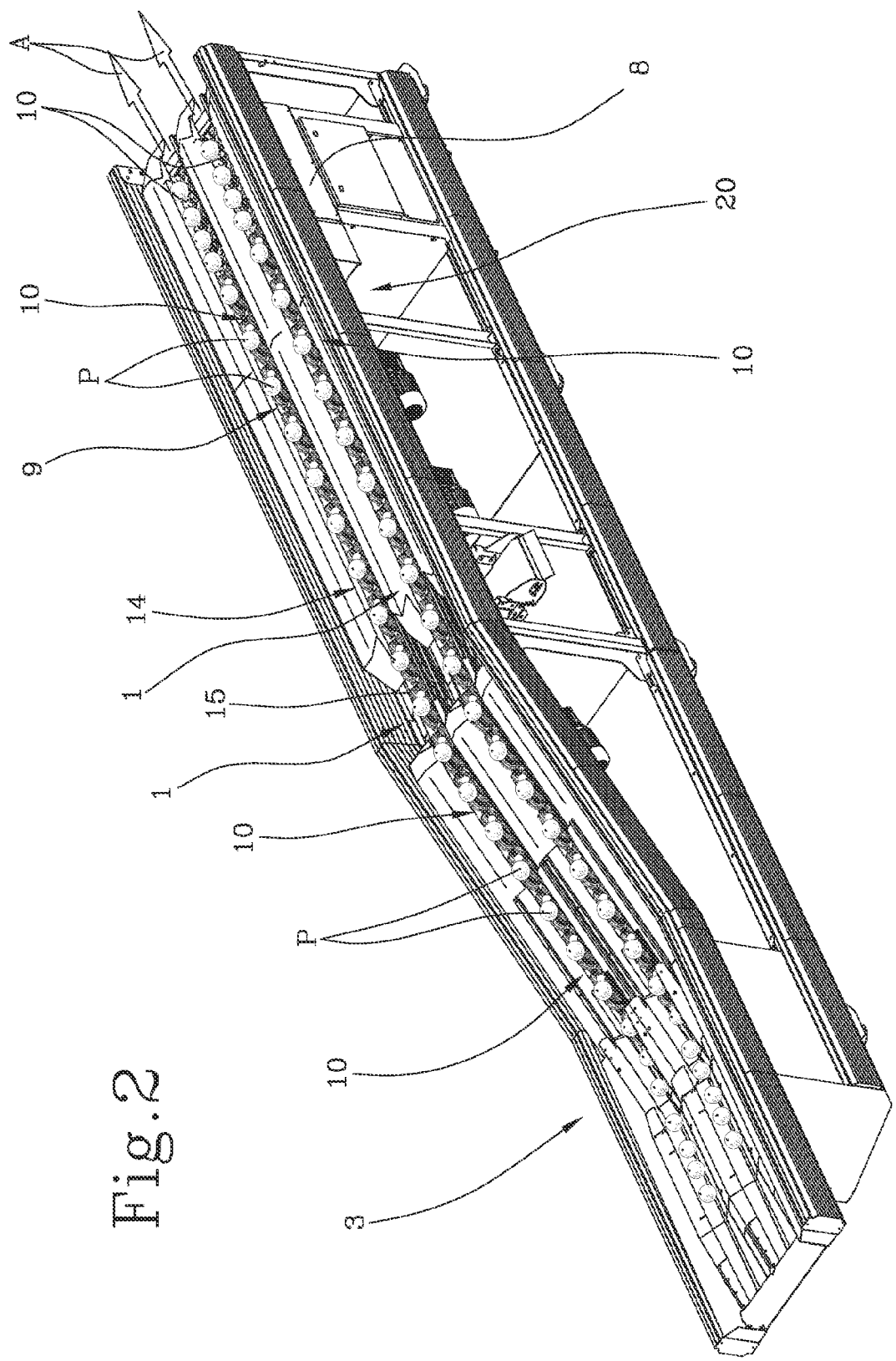
FIG. 2 illustrates a construction detail of the apparatus illustrated in FIG. 1 with some parts removed to better illustrate others.

FIGS. 1 and 2 effectively show two apparatuses alongside one another, arranged to process two parallel lines of products (P), even if the following description refers to a single apparatus.

The apparatus according to the present invention comprises a conveyor line (1), predisposed to convey products (P) along an advancement direction (A). The conveyor line (1) is arranged between an entry section (3), where the products (P) are arranged on the conveyor line (1), and an unloading section (4), arranged downstream of the entry section (3), where the agricultural products (P) are unloaded from the conveyor line (1).

A control section (6) is interposed between the entry section (3) and the unloading section (4). In particular the control section (6) can be provided with an optical device (7), of the known type, predisposed to provide a view of the surface of the products (P), in order to identify any surface or shape defects, as well as the colouring of the surface. The control section can further comprise a weighing device (8), also of the known type, predisposed to measure the weight of each product (P). The control section attributes a signal to each product indicative of the information provided by the optical device (7) and the weighing device (8). It is also possible to arrange just one of the optical device (7) or the weighing device (8).

The conveyor line (1) comprises a first conveyor device (9) predisposed to convey the agricultural products (P) forward, which extends from the entry section (3), through the control section (6), as far as the unloading section (4).

The conveyor line (1) further comprises a second conveyor device (20), predisposed to convey the products (P) forward and cause them roll over. Such second conveyor device (20) extends from the entry section (3) at least as far as an intermediate tract of the control section (6). The second conveyor device is movable between a first operating configuration, wherein it supports the products (P), and a second operating configuration, wherein it releases the products (P) onto the first conveyor device (9).

The apparatus according to the present invention therefore comprises two distinct conveyor devices to fulfill the tasks of moving the products forward and causing them to roll over. This allows any maintenance operations to be managed independently on the two devices.

Figure 3:
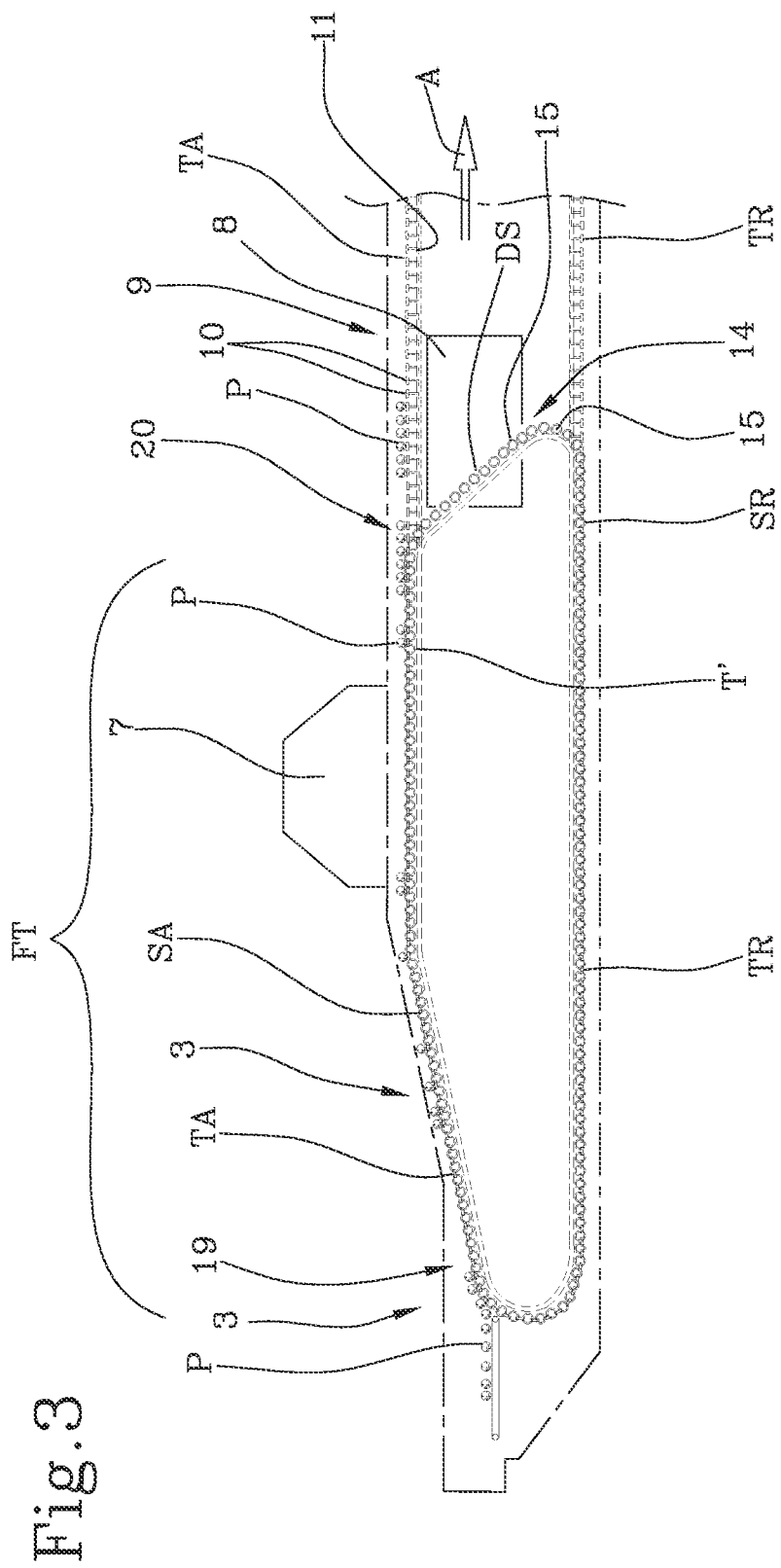
FIG. 3 shows a schematic and lateral view of an initial zone of the apparatus according to the present invention.

As shown in FIG. 3, the first and second conveyor device more along a respective closed loop path equipped with an upper branch (TA, SA). For at least a first tract of the upper branches (TA, SA) the paths of the first and second conveyor devices substantially coincide. After this first tract, the path of the first conveyor device (9) proceeds along the advancement direction (A), whereas the path of the second conveyor device (20) is inclined downwards along a descending tract (DS). In the transition from its upper branch (SA) to the descending tract (DS) the second conveyor device (20) passes from the first operating configuration to the second operating configuration.

The first conveyor device (9) comprises a plurality of trays (10), each of which is predisposed to house a product (P).

Figure 9:
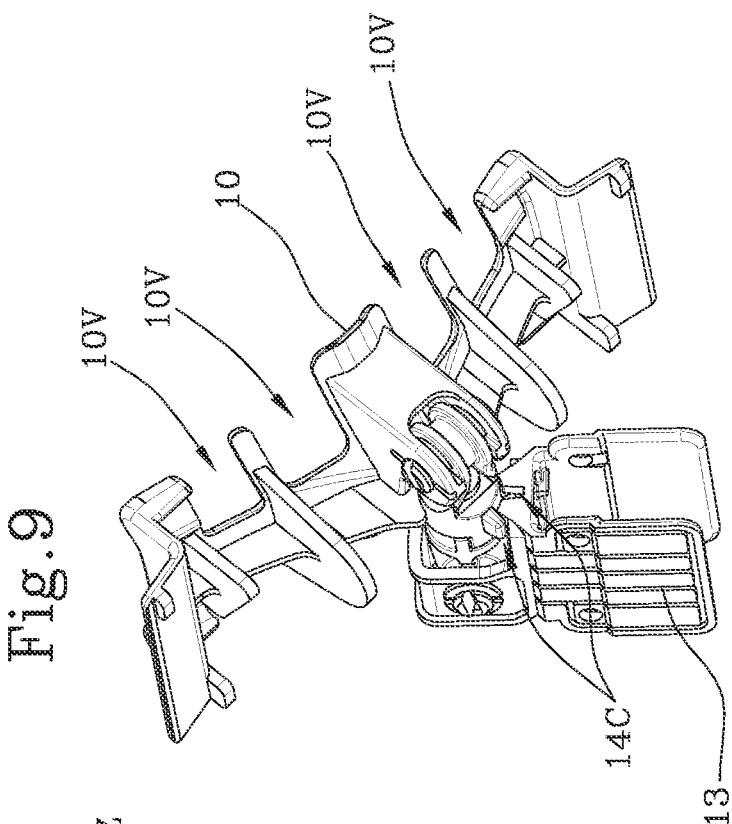
FIGS. 8 and 9 show more detailed views of the details shown in FIG. 7 in two distinct operating positions.
Figure 8:
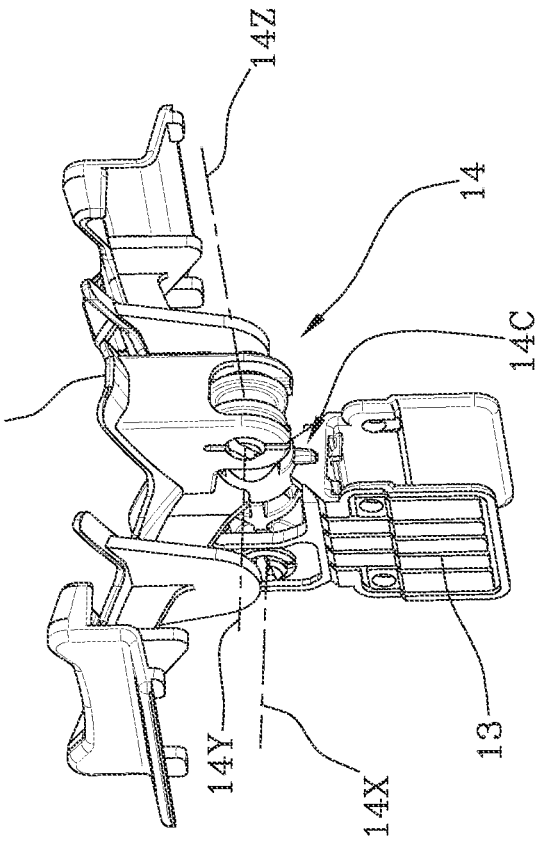
Figure 10:
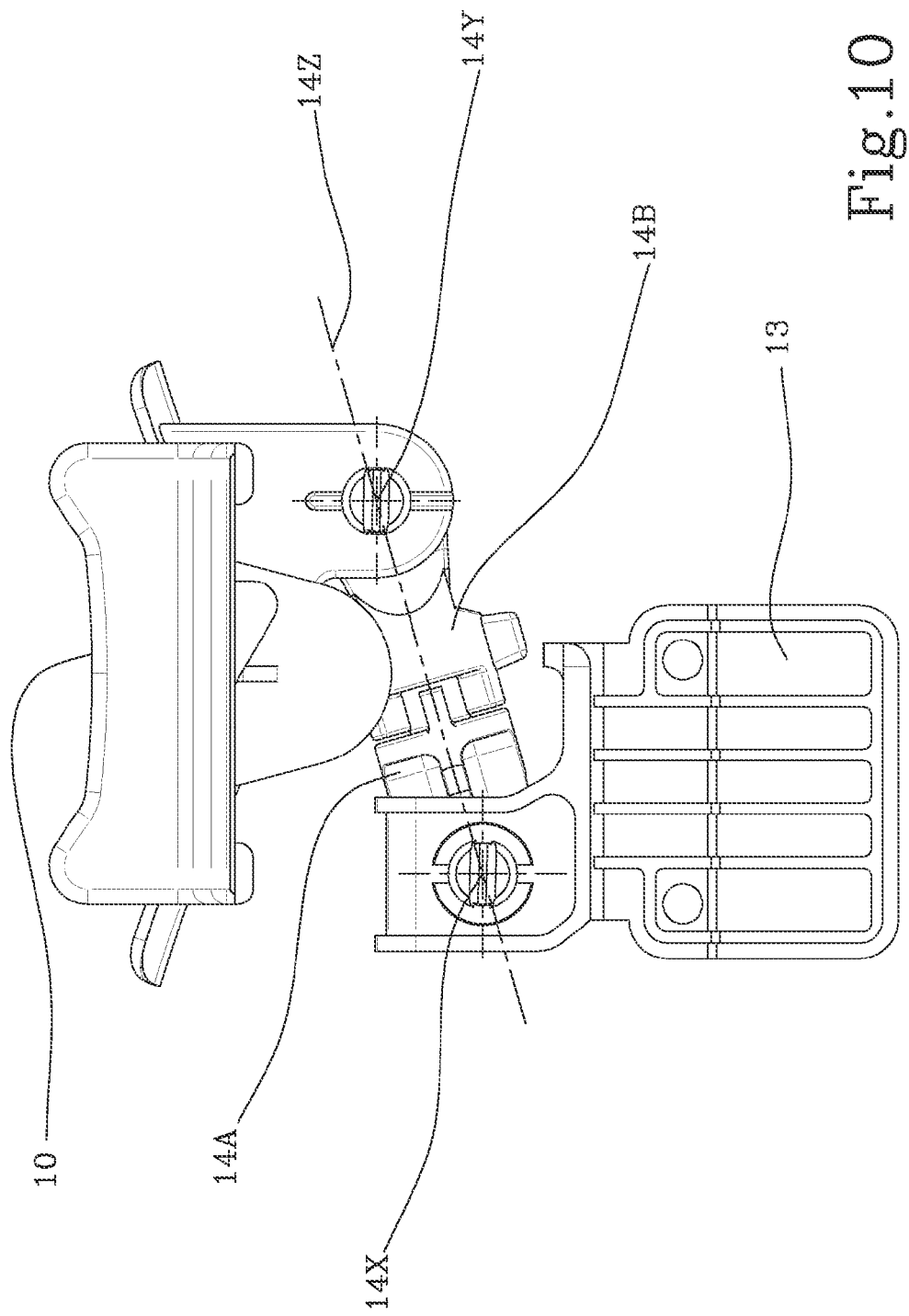
FIG. 10 shows a further vertical elevation view of a detail of FIG. 8 in a further operating position.

As shown in FIGS. 8 to 10, each tray (10) comprises a supporting foot (13), predisposed to be connected to a motor means (11). This motor means is preferably comprised of an articulated chain that defines the closed loop path of the first conveyor device (9). The articulated chain is motorized by means of non-illustrated gears and motor, and is guided, at least along the forward tract (TA), by means of profiles partially visible in FIG. 4. The supporting foot (13) is connected to the tray (10) by means of an articulated joint (14), structured so as to enable the tray (10) to more along a vertical direction and to rotate about an axis of rotation parallel to the advancement direction (A) between a conveying position, where a product (P) is kept in a substantially stable position (FIG. 8), and an unloading position, where the tray (10) is laterally inclined so as to enable unloading of the product (P) (FIG. 9).

In particular the articulated joint (14) comprises a pin (14A) associated with the supporting foot (13) rotatably about an axis of rotation (14X) that is horizontal and perpendicular to the advancement, direction (A). The articulated joint (14) further comprises a boss (14B), associated with the tray (10) rotatably about an axis of rotation that is horizontal and perpendicular to the advancement direction (A), wherein the pin (14A) is inserted with the possibility of rotating about a longitudinal axis of its own (14Z). Stop means (14C), preferably comprising a rib integral with the boss (14B) and a housing groove for the rib integral with the foot (13) (FIGS. 8 and 9), are predisposed for maintaining the tray (10) in the conveying position.

The presence of the articulated joint (14) is functional to the weighing device (8) and the unloading of the products (P). As for the weighing device (8), it was mentioned that it is a device of the known type, and therefore has not been illustrated in detail. It comprises two load cells arranged on opposite sides of the trays (10). Immediately upstream of the load cells, guides are arranged inclined upwards which are predisposed to interact with the lateral portions of the trays (10). These guides are structured so as to determine the raising of the trays (10) during the advancement motion. The trays (10), in the raised position, transit on the load cells. Thanks to the presence of the articulated joint (14), the trays (10) weigh down on the load cells only with their own weight, the weight of the articulated joint (14) and the weight of the conveyed product (P). The trays (10) can be raised due to the articulated joint (14), and in particular due to the possibility of rotation about the axes of rotation (14X, 14Y) horizontal and perpendicular to the advancement direction (A).

Likewise, the products (P) can be unloaded due to the articulated joint (14), in particular due to the rotation of the tray (10) about the longitudinal axis (14Z) made possible by the rotatable coupling between the pin (14A) and the boss (14B). A product (P) is unloaded by means of a known way through an actuator which, on command, raises one of the ends of the tray (10) causing its rotation about the longitudinal axis (14Z). In the absence of the strain exerted by the aforementioned actuator, the tray (10) remains in its own conveying position thanks to the presence of the stop means (140) and in particular thanks to the engagement of the rib in its own housing groove. Each tray (10) can rotate about the longitudinal axis (14Z) in both directions so as to assume two unloading positions on one side or on the opposite side with respect to the advancement direction (A).

The second conveyor device (20) comprises a plurality of supporting elements (15), which are movable between a raised position, corresponding to the first operating configuration of the second conveyor device, wherein the products (P) are supported by the supporting elements (15), and a lowered position, corresponding to the second operating configuration, wherein the supporting elements (15) are arranged below the trays (10), and the products (P) are supported only by the trays (P).

The movement of the supporting elements (15) between the raised position and the lowered position is obtained substantially by means of the closed loop path along which the supporting elements (15) move. As previously mentioned, the trays (10) are movable along a closed loop path (TA, TR) which has an upper forward branch (TA) and a lower return branch (TR). In turn the supporting elements (15) are movable along a closed loop path which has an upper forward branch (SA) and a lower return branch (SR). At least a first tract of the forward branches (TA, SA) is arranged in such a manner that the supporting elements (15) are moving in the raised position in synchronism with the trays (10). At the end of the first tract (FT) of the forward branches (TA, SA), the path of the rotating elements (15) has a descending tract (SD), along which the supporting elements (15) are lowered with respect to the trays (10), arranged in the lowered, position, depositing the products (P) on the trays (10) (FIGS. 3 and 6).

Figure 4:
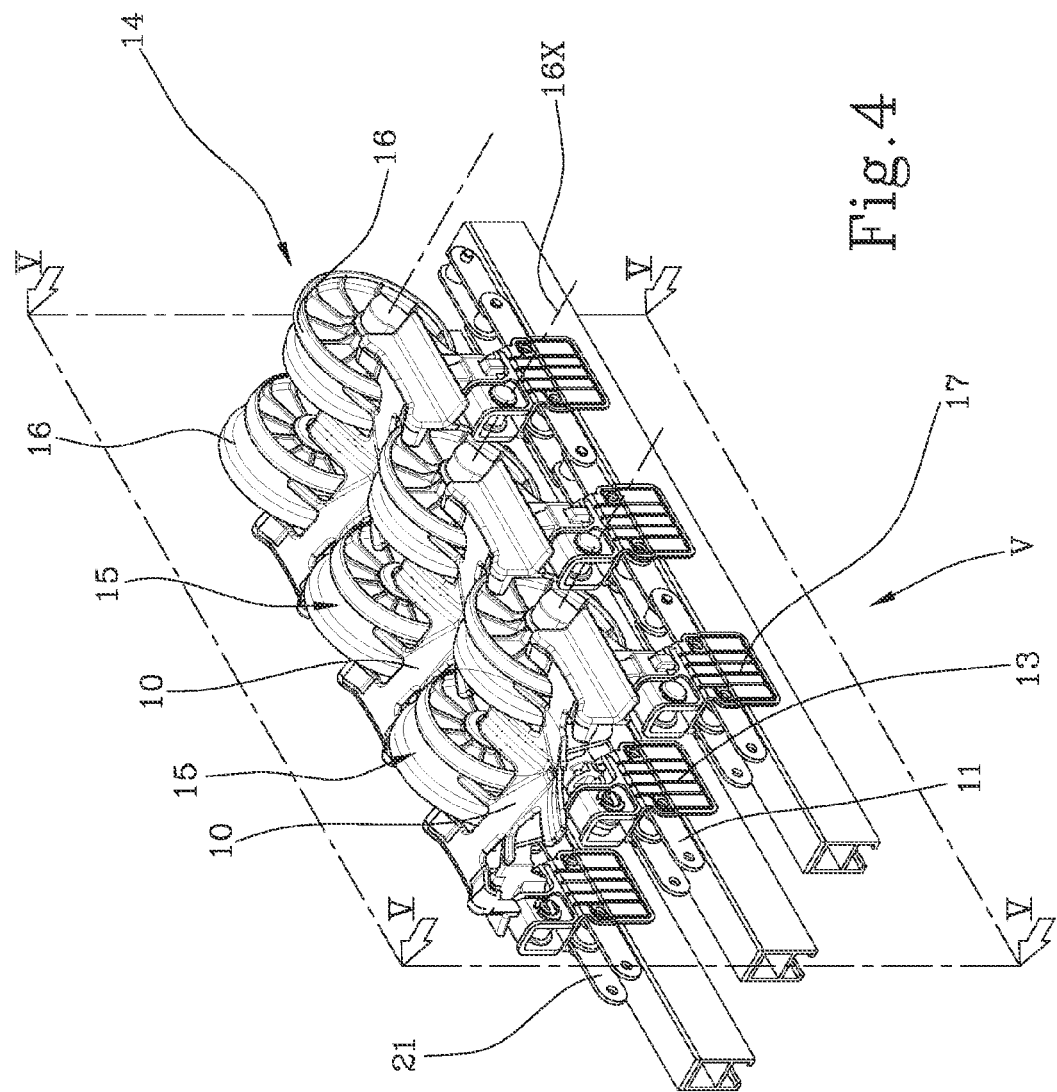
FIG. 4 shows an axonometric and schematic view of a further construction detail of the apparatus of FIG. 1.
Figure 5:
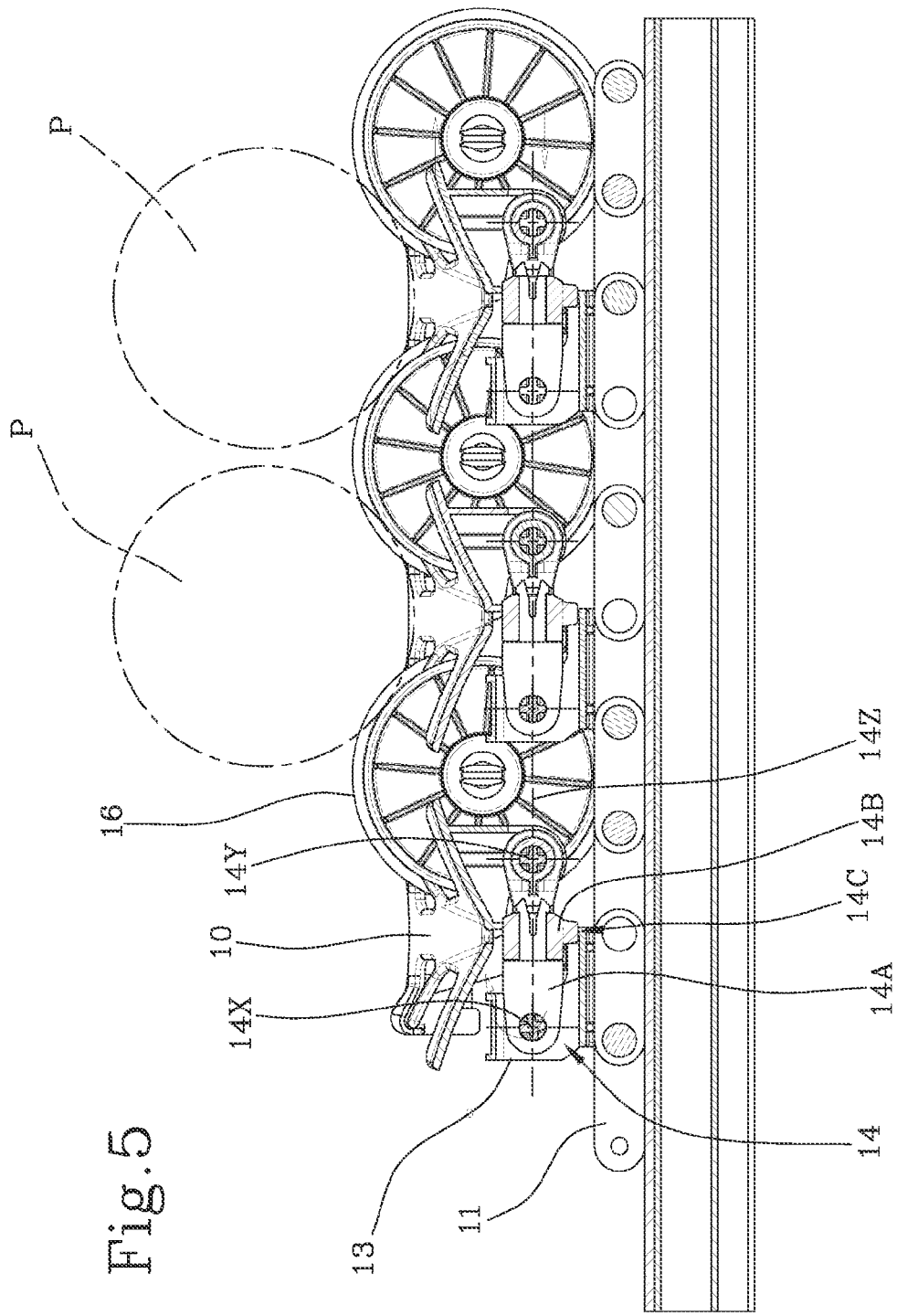
FIG. 5 shows a section view according to the V-V plane of FIG. 4.
Figure 6:
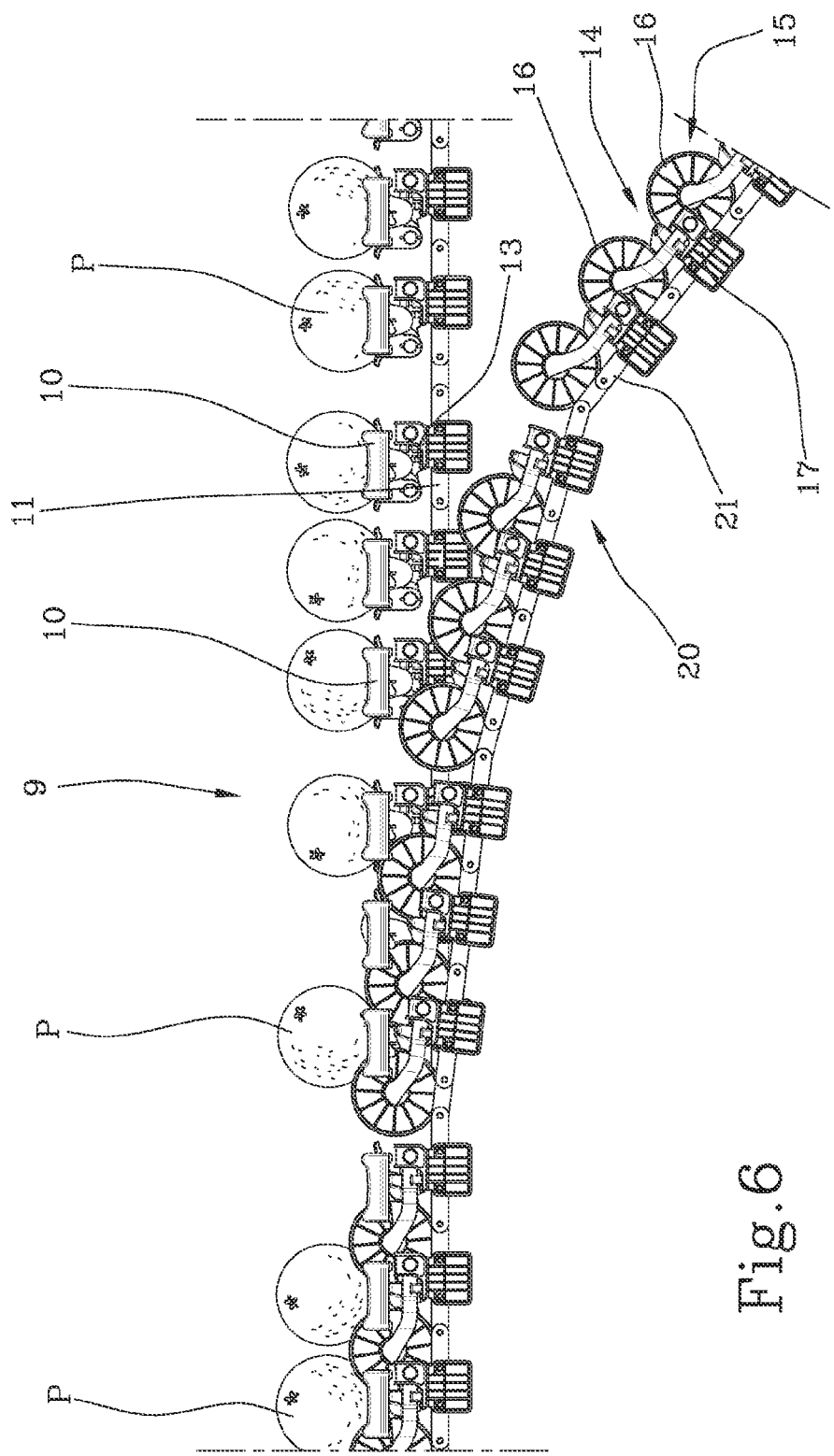
FIG. 6 shows a schematic and vertical elevation view of a zone of the apparatus according to the present invention.
Figure 7:
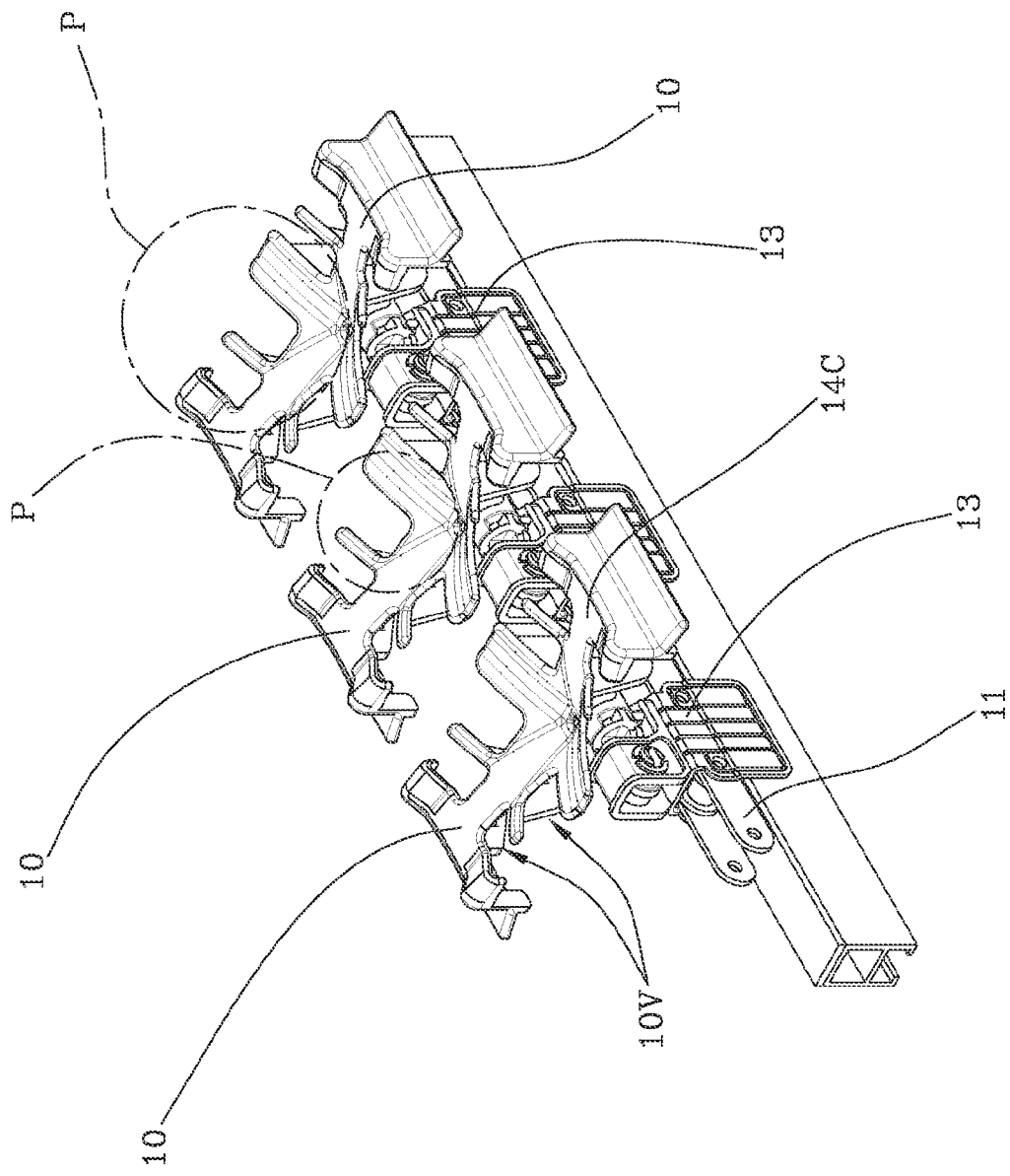
FIG. 7 shows an axonometric view of some details of the apparatus.

As can be seen better in FIGS. 4 to 6, the trays (10) and the supporting elements (15) are aligned in a parallel row to the advancement direction (A). At least along said first tract (FT) of the forward branches (TA, SA), the supporting elements (15) are intercalated between the trays (10) in such a manner as to form an alternating sequence of trays (10) and supporting elements (15), wherein a tray (10) is interposed between two consecutive supporting elements (15). In this way, along the first tract (FT) of the forward branches (TA, SA), wherein the supporting elements (15) are in the raised position, each product (P) is supported by two consecutive supporting elements (15) above a tray (10) interposed between the two consecutive supporting elements (15). Subsequent to the end of the first tract (FT) of the forward branches (TA, SA), the supporting elements (15) are lowered proceeding along the descending tract (SD) of their own path. Each fruit (P) is therefore arranged resting on the tray (10) below interposed between the two supporting elements (15) that previously supported it before being lowered along the descending tract (SD).

With particular reference to FIG. 3, the supporting elements (15) are arranged in the lowered position upstream of the weighing device (8). This allows the products (P), when transiting in correspondence with the weighing device (8), to be supported by the tray (10) alone which, as already described, is structured so as to allow precise and effective weighing of the products (P).

Each supporting element (15) of the second conveyor device (20) is structured so as to determine a rotation of a supported product (P).

For that purpose, each supporting element (15) preferably comprises a pair of rollers (16) that are aligned with respect to an axis of rotation (16X), which is horizontal and perpendicular with respect to the advancement direction (A), and that are arranged symmetrically on opposite sides with respect to the advancement direction (A).

Each roller (16) is associated with a supporting foot (17), predisposed to be associated with a motor means (21), by means of an arm (18) pivoted to the supporting foot (17) about an axis of rotation (18X) that is horizontal and perpendicular to the advancement direction (A). The motor means (21) is comprised, for example, of an articulated chain that defines the closed loop path of the second conveyor device (20). The articulated chain is motorized by means of non-illustrated gears and motor, and is guided, at least along the forward tract (SA), by means of profiles partially visible in FIG. 4.

As can be seen in FIGS. 4 and 5, the trays (10) and the rollers (16) are conformed in such a way that, in the raised position, the rollers (16) protrude at least partially above the trays (10). For that purpose the trays (10) have breaks (10V) within which the rollers (16) can be partially arranged. Overall the trays (10) have a concave conformation with concavity facing upwards.

Therefore, the trays (10) are effectively mechanically free from the second conveyor device and the supporting elements (15). When the second conveyor device (20) is arranged in the second operating configuration, that is, when the supporting elements (15) are arranged in the lowered position moving forwards along the descending tract (DS) of its path, the trays (10) are conveyed independently forward towards the unloading section (4). Therefore, the trays (10) have a much more contained overall height than apparatuses of the known type wherein the trays are also associated with the rollers for the rotation of the conveyed products. This allows the height from which the products are unloaded to be reduced, therefore the risks of damage to the products are equally reduced.

Figure 11:
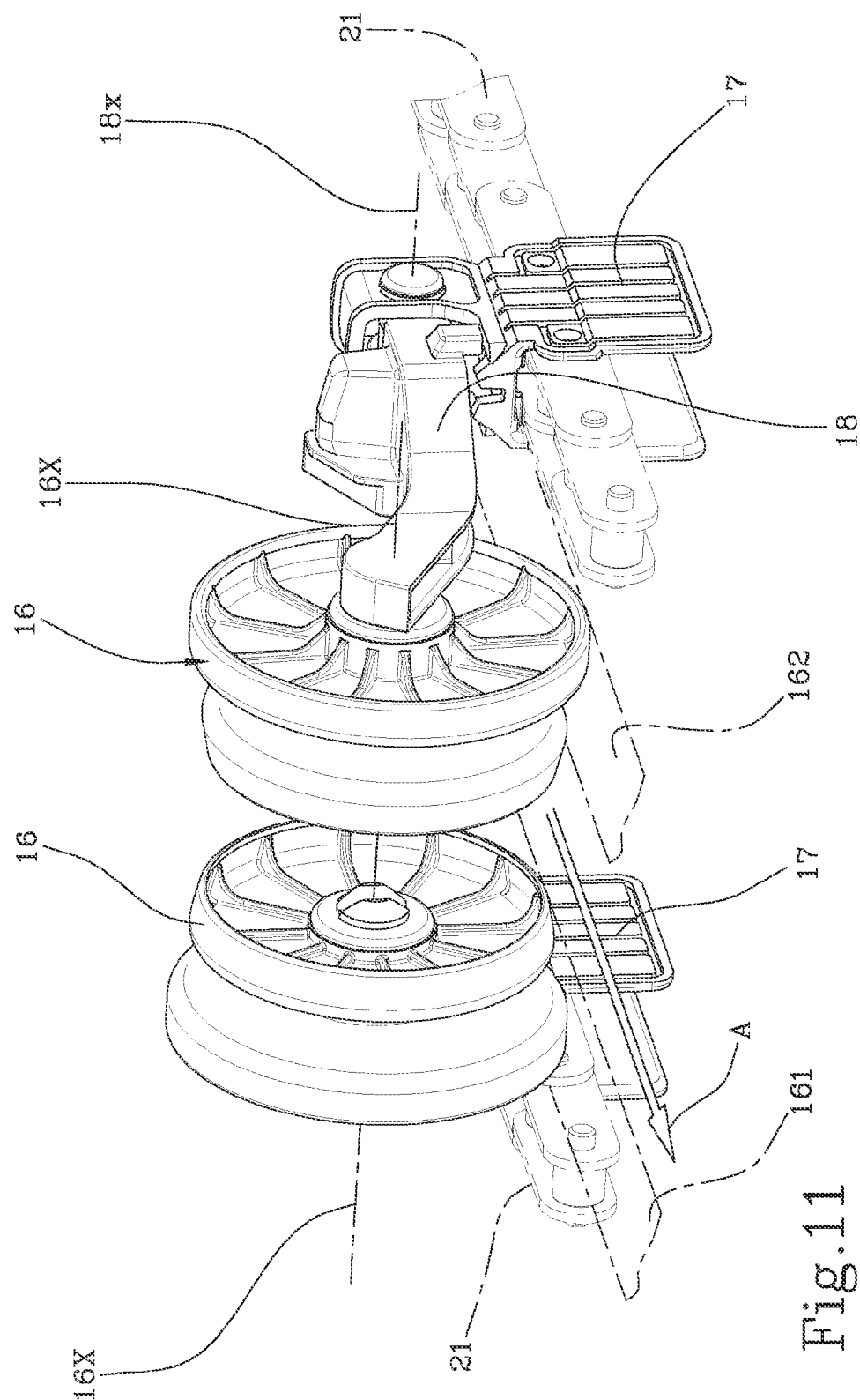
FIG. 11 shows an axonometric view of other details of the apparatus.

The second conveyor device (20) comprises rotation means (161, 162) predisposed to determine the rotation of the rollers (16) about their own axes of rotation (16X). Preferably such rotation means comprise a pair of motorized belts (161, 162), only partially illustrated in FIG. 11 since they are devices of the known type, that are slideable in a direction parallel to the advancement direction (A) and are arranged in contact with the rollers (16) on opposite sides with respect to the advancement direction (A). In particular the motorized belts (161, 162) are located below the rollers (16). Each roller (16) rests on the motorized belt arranged on its own side substantially without a vertical constraint. This is enabled by the rotatable coupling about the horizontal axis (18X) between the arm (18), which connects the roller (16) to its own supporting foot (17), and the supporting foot (17) itself. Each roller (16) therefore weighs down on its own motorized belt only with its own weight, the weight of the arm (18) and potentially with the weight of the supported product (P).

Advantageously, each motorized belt can be activated independently from the other, so that it is possible to bring about the rotation of the rollers (16) arranged on one side at a different speed with respect to the rollers (16) arranged on the other side with respect to the advancement direction (A). The possibility to rotate the rollers (16) arranged on one side at a different speed with respect to the rollers arranged on the other side allows the rotation motion given to the products (P) to be varied and adjusted.

The operation of the device takes place in the following ways.

In the entry section (3) the products (P) are fed to the conveyor line (1), and in particular to the first tract (FT) of the forward branches (TA, SA) of the first and the second conveyor device. Along the first tract (FT) the second conveyor device (20) is in the first operating configuration in correspondence with which the products (P) are supported by the supporting elements (15). In particular each product (P) is supported by two pairs of rollers (16) above a tray (10). The rollers (16) are activated in rotation by means of motorized belts (161, 162), so that each product (P) rolls over as it moves forward along the advancement direction (A). The products (P) proceed along the first tract (FT), rolling over, and transit in correspondence with the optical device (7) that performs the surface observations on each product (P). In a section downstream of the optical device (7), the second conveyor device (20) is arranged in its second operating configuration, wherein the supporting elements (15) are arranged in the lowered position, proceeding along the descending tract (SD) and deposit the products (P) on the trays (10). The products (P), each supported by a tray (10), are conveyed along the advancement direction (A) first in correspondence with the weighing device (8) and then as far as the unloading section (4) where each tray (10) is laterally inclined from the conveying position to the unloading position to enable unloading of its product (P).

The first conveyor device (9), downstream of the unloading section (4), follows a curve where the forward branch (TA) connects with the return branch (TR) below. The return branch (TR) of the first conveyor device (9) is joined with the return branch (SR) of the second conveyor device (20) at the end of the descending tract (SD) of the second conveyor device (20). The trays (10), which in the return branch (TR) are facing downwards, are placed again in the intermediate position between the supporting elements (15) which are equally facing downwards. In this configuration the return branches (TR, SR) of the first and the second conveyor device are connected with the first tract (FT) of the forward branches (TA, SA) with the second conveyor device (20) which is already in its first operating configuration, i.e. with the supporting elements (15) that are already in the raised position, ready to receive a new product (P).

As can be seen in FIG. 3, the path followed by the first conveyor device (9) is longer than the path followed by the second conveyor device (20). This means that the articulated chain (11) that activates the first conveyor device (9) could be subject to larger extension than the articulated chain (21) that activates the second conveyor device (20). The supporting elements (15) could therefore be faster than the trays (10).

Figure 12:
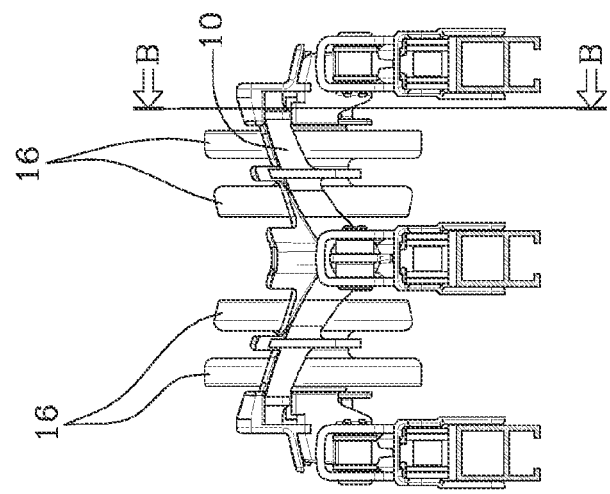
FIGS. 12 and 13 show two detailed views of particular zones of the apparatus.
Figure 13:
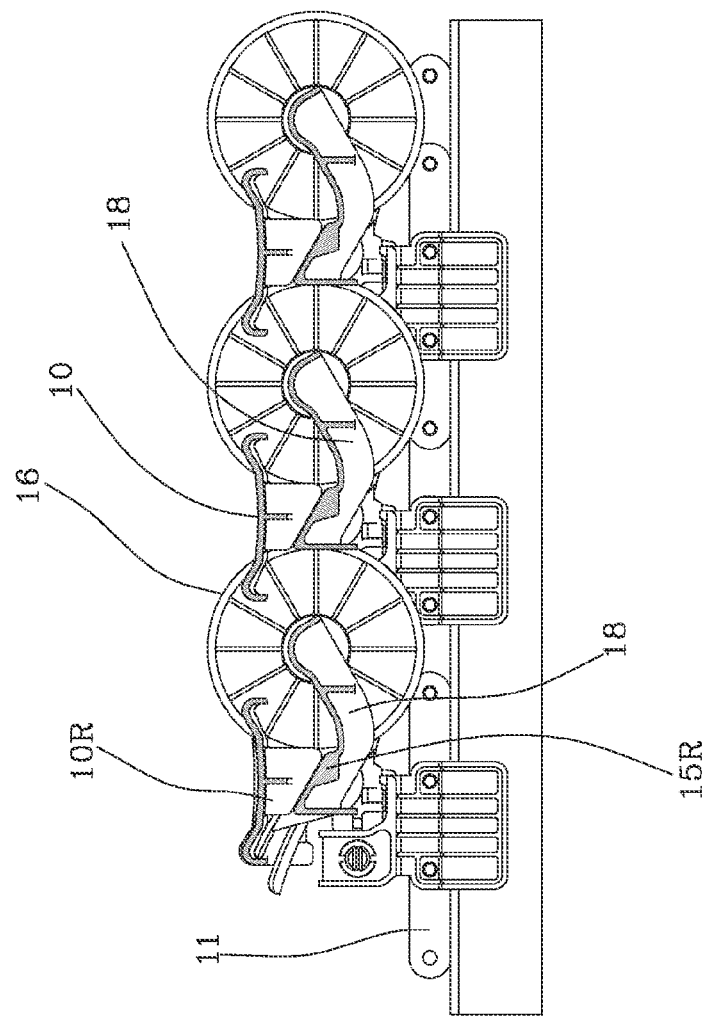

To prevent the trays (10) and the rollers (16) interfering with one another in contact, each tray (10) is provided with an inclined surface (10R) predisposed to come into contact with an inclined surface (15R) associated with an adjacent roller (16) (FIGS. 12 and 13). In particular the inclined surface (15R) associated with the roller (16) is integral with the supporting arm (18) of the roller (16). The inclined surfaces (10R, 15R) have an inclination such that any relative sliding between the rollers (16) and the trays (10) that tends to accelerate the rollers (16) with respect to the trays (10), causes a slight vertical shifting of the trays (10), which, on the forward branch (TA), is in the upward direction, whereas on the return branch (TR) is in the downward direction. The vertical shifting of the trays (10) prevents contact with the rollers (16).

As already mentioned, the unloading section (4) comprises a plurality of unloading zones (5) of the products (P) each of which is intended to collect products (P) with the same characteristics.

An unloading actuator is located at each unloading zone (5), which is not shown since it is of the known type, predisposed to cause the rotation of the trays (10) from the conveying position to the unloading position. Every time a tray (10) transits in correspondence with an unloading zone (5) intended for the product (P) that the tray is conveying, the corresponding unloading actuator is activated so as to cause the rotation of the tray (10) into the unloading position wherein the product (P) rolls off the tray (10) itself. The activation of the various unloading actuators is controlled by a processor that receives the signals identifying the characteristics of each product (P) from the control section. Therefore, the processor knows the time at which each product (P) transits in its own destination zone and consequently determines the activation of the relative unloading actuator.

The apparatus according to the present invention provides important advantages.

First of all, the use of two distinct conveyor devices to fulfill the tasks of conveying the products forward and causing them to roll over enables any maintenance operations on the two devices to be managed independently.

In particular, the presence of the trays (10) and the supporting devices (15) respectively associated with the first and the second conveyor device enables separate operations to be performed on each device without needing to operate on the other one too.

Furthermore, the disassociation between the trays (10) and the supporting devices (15) enables very simple construction of the trays (10) themselves that can be structured with a much more contained vertical extension with respect to apparatuses of the known type. This substantially enables the height from which the products are unloaded to be reduced, with the advantage of notably reducing the risks of damage to the products.

The apparatus according to the present invention further has overall dimensions that are very comparable with apparatuses of the known type. This enables the apparatus according to the present invention to be able to replace apparatuses of the known type without any special adaptations.

The invention claimed is:

1. An apparatus for sorting agricultural products, comprising:
   a conveyor line (1) predisposed to convey products (P) along an advancement direction (A);
   an entry section (3), where the products (P) are arranged on the conveyor line (1);
   an unloading section (4), arranged downstream of the entry section (3), and where the agricultural products (P) are unloaded from the conveyor line (1);
   a control section (6), interposed between the entry section (3) and the unloading section (4), and predisposed to attribute a signal indicative of predefined physical characteristics to each product (P);
   characterized in that said conveyor line comprises:
   a first conveyor device (9) predisposed to convey the agricultural products (P) forward, and extending from the entry section (3), through the control section (6), and as far as the unloading section (4); a second conveyor device (20), predisposed to convey the products forward and to cause the products (P) to roll over, extending from the entry section (3) to at least as far as an intermediate tract of the control section (6) and that is movable between a first operating configuration, wherein it supports the products (P), and a second operating configuration, wherein it releases the products (P) onto the first conveyor device (9);
   wherein the first conveyor device (9) comprises a plurality of trays (10), each of which being predisposed to hold a product (P); the second conveyor device (20) comprises a plurality of supporting elements (15), which are movable between a raised position, corresponding to the first operating configuration of the second conveyor device, wherein the products (P) are supported by the supporting elements (15), and a lowered position, corresponding to the second operating configuration, wherein the supporting elements (15) are arranged below the trays (10), and the products (P) are supported only by the trays (10);
   wherein each tray (10) comprises a supporting foot (13), predisposed to be connected to a motor means (11), and an articulated joint (14) that connects the supporting foot

(13) to the tray (10) and is structured so as to enable the tray (10) to move along a vertical direction and to rotate about an axis of rotation parallel to the advancement direction (A) between a conveying position, where a product (P) is kept in a substantially stable position, and an unloading position, where the tray (10) is laterally inclined so as to enable unloading of the product (P); wherein the articulated joint (14) comprises: a pin (14A) associated with the supporting foot (13) rotatably about an axis of rotation that is horizontal and perpendicular to the advancement direction (A); a boss (14B), associated with the tray (10) rotatably about an axis of rotation that is horizontal and perpendicular to the advancement direction (A), wherein the pin (14A) is inserted with the possibility of rotating about a longitudinal axis of its own; stop means (14C), predisposed for maintaining the tray (10) in the conveying position.

2. The apparatus according to claim 1, wherein: the trays (10) are movable along a closed loop path (TA, TR) that has an upper forward branch (TA) and a lower return branch (TR); the supporting elements (15) are movable along a closed loop path that has an upper forward branch (SA) and a lower return branch (SR); at least a first tract of the forward branches (TA, SA) is arranged in such a manner that the supporting elements (15) are moving in the raised position in synchronism with the trays (10); at the end of said first tract of the forward branches (TA, SA), the path of the supporting elements (15) has a descending tract (SD), along which the supporting elements (15) are arranged in the lowered position, depositing the products (P) on the trays (10).

3. The apparatus according to claim 2, wherein: the trays (10) and the supporting elements (15) are aligned in rows parallel to the advancement direction (A); at least along said first tract of the forward branches (TA, SA), the supporting elements (15) are intercalated between the trays (10) in such a manner as to form an alternating sequence of trays (10) and supporting elements (15), wherein a tray (10) is interposed between two consecutive supporting elements (15).

4. The apparatus according to claim 1, wherein each supporting element (15) of the second conveying device (20) is structured so as to determine a rotation of a supported product (P).

5. The apparatus according to claim 1, wherein each supporting element (15) comprises a pair of rollers (16) that are aligned with respect to an axis of rotation (16X), which is horizontal and perpendicular with respect to the advancement direction (A), and that are arranged on opposite sides with respect to the advancement direction (A).

6. The apparatus according to claim 5, wherein each roller (16) is associated with a supporting foot (17), predisposed to be associated with a motor means (14C), by means of an arm (18) pivoted to the supporting foot (17) about an axis of rotation (18X) that is horizontal and perpendicular to the advancement direction (A).

7. The apparatus according to claim 6, wherein the second conveyor device (20) comprises rotation means (161, 162) predisposed to determine the rotation of the rollers (16) about their own rotation axes (16X).

8. The apparatus according to claim 7, wherein the rotation means comprises a pair of motorized belts (161, 162) that are slidable in a direction parallel to the advancement direction (A) and arranged on opposite sides with respect to the advancement direction (A) in contact with the rollers (16).

9. The apparatus according to claim 8, wherein each motorized belt can be activated independently of the other, so that it is possible to bring about the rotation of the rollers (16) arranged on one side at a different speed with respect to the rollers (16) arranged on the other side with respect to the advancement direction (A).

10. The apparatus according to claim 5, wherein: each tray (10) is provided with an inclined surface (10R) predisposed to come into contact with an inclined surface (15R) associated with an adjacent roller (16); the inclination of said inclined surfaces (10R, 15R) is such that eventual relative sliding between the rollers (16) and the trays (10) that tends to accelerate the rollers (16) with respect to the trays (10), causes a slight vertical shifting of the trays (10), which prevents contact with the rollers (16).

\* \* \* \* \*